Figure 1:
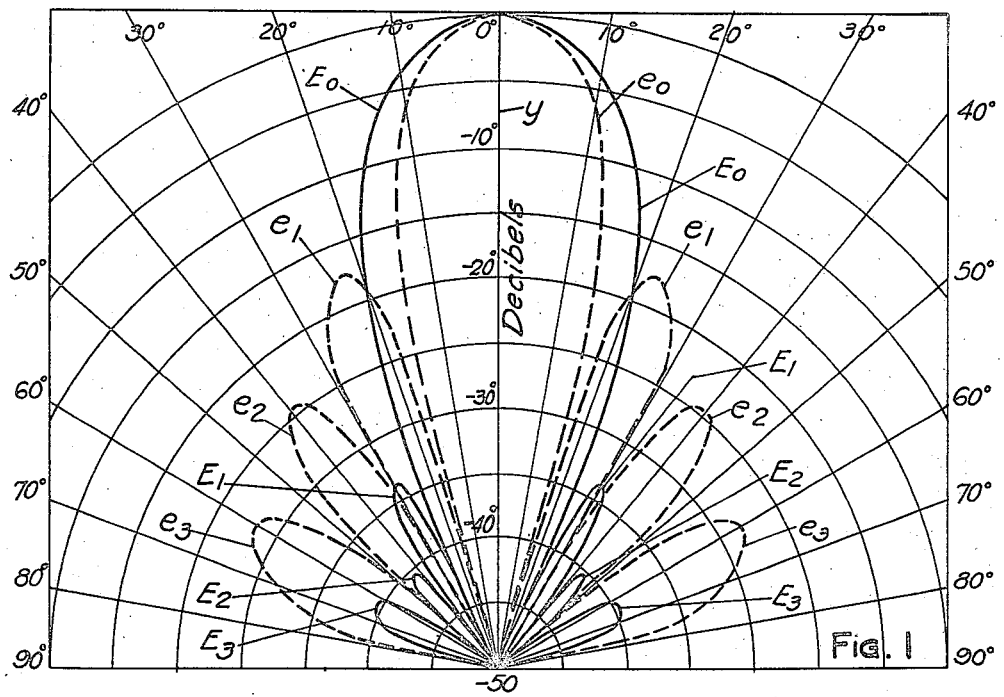

INVENTOR.
HAROLD M. HART
BY
ATTORNEY.

Sept. 17, 1946.    H. M. HART    2,407,662
METHOD AND APPARATUS FOR SUBMARINE SIGNALING
Original Filed July 22, 1939    3 Sheets-Sheet 2

INVENTOR.
HAROLD M. HART.
BY
ATTORNEY.

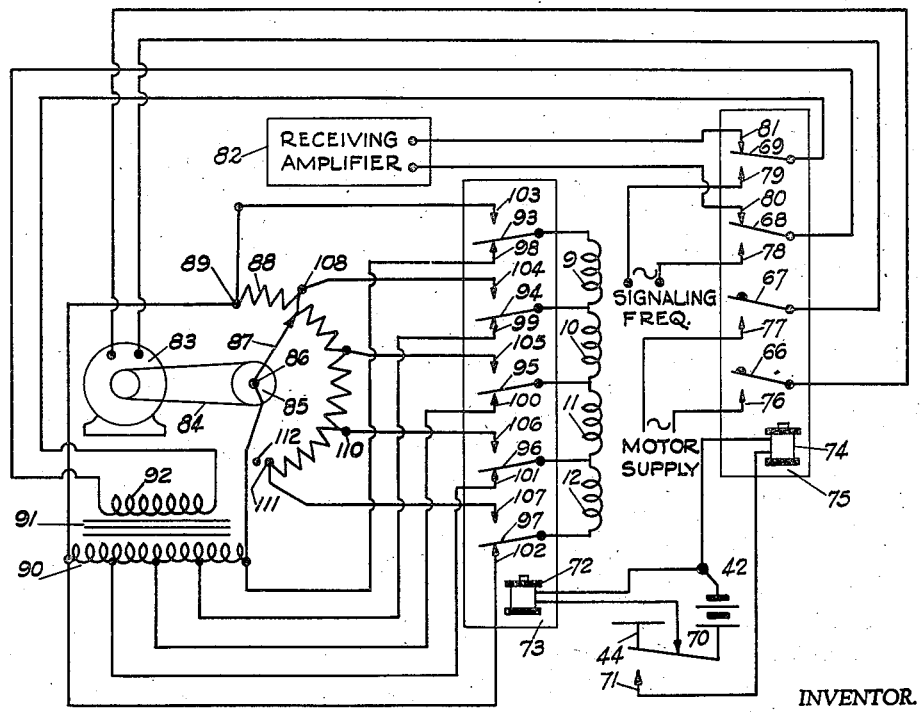

Patented Sept. 17, 1946

2,407,662

UNITED STATES PATENT OFFICE 2,407,662

METHOD AND APPARATUS FOR SUBMARINE SIGNALING

Harold M. Hart, Cambridge, Mass., assignor, by mesne assignments, to Submarine Signal Company, Boston, Mass., a corporation of Delaware Original application July 22, 1939, Serial No. 285,902. Divided and this application July 8, 1940, Serial No. 344,345

13 Claims. (Cl. 177—386)

This application is a division of my copending application Serial No. 285,902, filed July 22, 1939.

The present invention relates to translating devices for converting compressional wave energy to electrical energy and vice versa. More particularly, the present invention relates to such devices as used for signaling under water and is particularly concerned with the transmission and reception of compressional wave energy in a beam.

It has heretofore generally been understood that if a vibratable piston be made large in its dimensions in comparison with the wave length of the compressional waves at the signaling frequency, a concentration of energy along the axis perpendicular to the radiating surface will be obtained. However, such a concentration of energy in a main beam is accompanied by smaller concentrations of energy in directions at various angles with the axis of the main beam.

When the relative acoustic energy intensities in the free medium as produced by such a device at a constant distance large compared to the dimensions of the device are plotted with respect to the several angular directions from the axis perpendicular to the radiating surface in any plane perpendicular to the device, as on polar coordinate graph paper, the main concentration of energy will appear as a large lobe representing the main beam, and a plurality of auxiliary lobes of ears representing the subsidiary energy concentrations in directions other than that of the main beam will also appear. These auxiliary lobes of the beam pattern are often objectionable, particularly for signaling under water as in acoustic ranging for the determination of the distance and direction of remote objects. Such subsidiary energy concentrations can be reduced by not driving the plane radiating surface as a piston but by driving it at varying amplitudes over its surface. It is an object of the present invention to provide an amplitude distribution for the radiating surface such as to produce a beam pattern in the medium with a main beam narrow enough to produce a good directional effect and with the subsidiary maxima reduced to a very small value. Other objects of the invention will appear from the description given below.

In the description and claims in this application the term "beam pattern" is applied to both reception and transmission. With respect to transmission it means the variation of compressional wave intensity produced by the transmitting device in a free medium and measured at various angular directions from the axis perpendicular to the radiating surface at a constant distance, large compared with dimensions of the device. For reception it means the response of the device to plane waves of equal intensity arriving at various angles to the axis perpendicular to the receiving surface. Such beam patterns may be plotted in rectangular or polar coordinates. Such plots if made complete would be quite complicated. It is customary, therefore, to make them only with respect to some plane perpendicular to the radiating or receiving surface. The beam pattern for transmission is determined by the amplitude with which various portions of the radiating surface are energized. The beam pattern for reception is determined by the varying response of acoustic to electric energy transformers associated with various portions of the receiving surface when it is excited at uniform amplitude. The beam patterns for reception and transmission of a given transceiver will be identical if the electroacoustic energy transformers associated with various portions of the radiating and receiving surface are bi-lateral and if they are linear insofar as the relation of vibrational amplitude to electrical amplitude is concerned.

Figure 2:
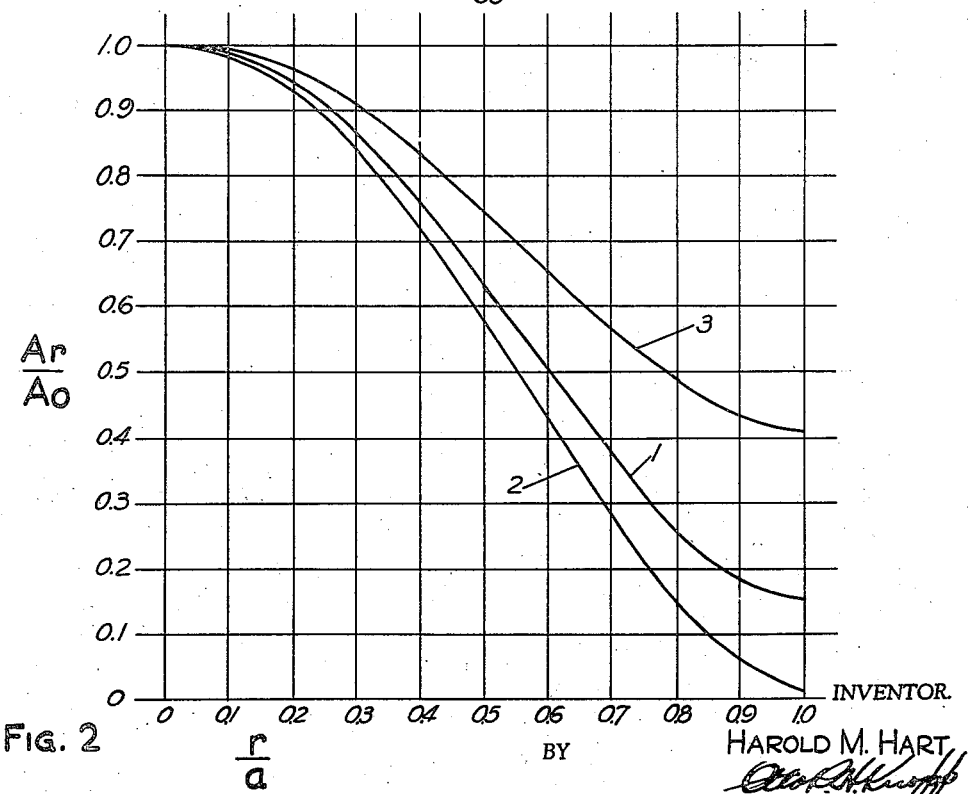
Figure 3:
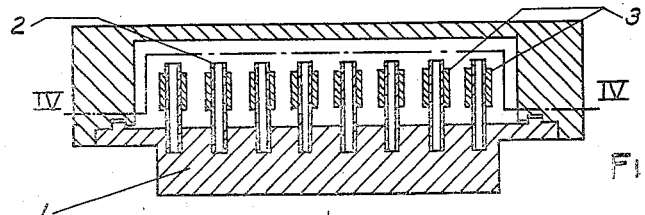
Figure 4:
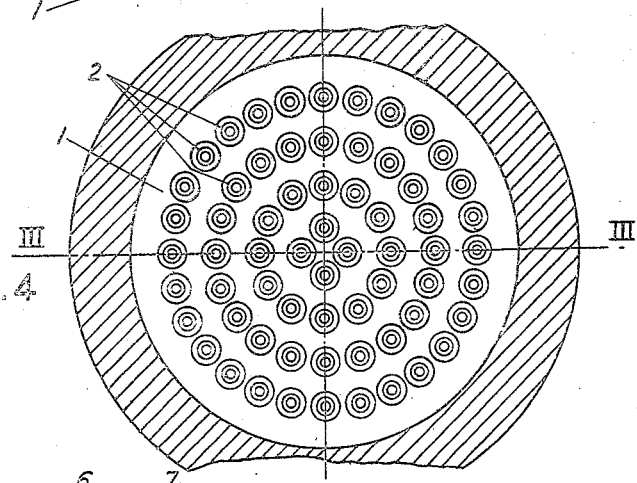
Figure 5:
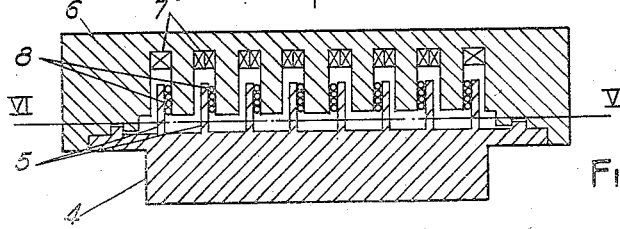
Figure 6:
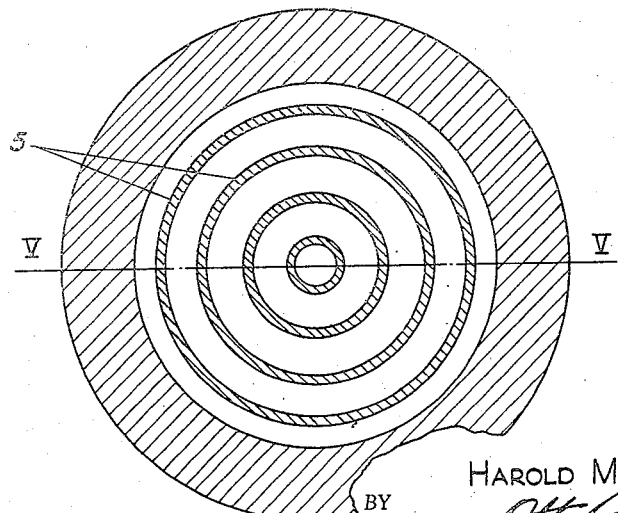

The invention will best be understood from the following description taken in connection with the accompanying drawings in which Fig. 1 is a polar diagram of representative radiation patterns of a radiating surface operated with uniform amplitude over its entire area and of a radiating surface having an amplitude varying over its surface in accordance with the present invention; Fig. 2 is a graph showing radiating surface amplitudes in accordance with the present invention for the production of one of the beam patterns shown in Fig. 1, or approximations thereof; Figs. 3 and 4 show diagrammatically a magnetostriction oscillator for producing compressional wave energy, suitable for use with the present invention, Fig. 3 being a vertical cross-section and Fig. 4 being a horizontal cross section of the device in Fig. 3 along the line IV—IV; Figs. 5 and 6 represent diagrammatically an electrodynamic oscillator suitable for use with the present invention, Fig. 5 being a vertical cross section through the device and Fig. 6 being a cross section taken along the line VI—VI of Fig. 5; Fig. 7 is a schematic diagram of an arrangement for electrically operating devices like those of Figs. 3 to 5 in accordance with one feature of the present invention; and Fig. 8 is a schematic diagram of an arrangement for electrically operating devices like those of Figs. 3 to 5 in accordance with a further feature of the present invention.

As shown by the dotted curve in Fig. 1, the beam pattern produced in a free medium by a representative extended, continuous, finite, circular plane radiating surface having a diameter greater than the wave length at the signaling frequency and vibrating as a piston with uniform amplitude has a maximum energy concentration along an axis $y$ perpendicular to the radiating surface which is assumed to have no rear radiation in the medium. At small angles from the axis $y$ the energy decreases as indicated by the dotted line $e_0$. At some larger angle from the axis $y$ the radiated energy will fall to zero and at a still greater angle again build up to a lower but still significant maximum value; then again fall into zero as the angle is further increased, and so on throughout the hemisphere facing the radiating piston. Thus, there will appear successive lobes of energy concentration at various angular distances from the axis $y$ as indicated in Fig. 1 by the lobes $e_1$, $e_2$ and $e_3$. If the piston be circular, it will be understood that these subsidiary lobes are in the form of hollow cones, the graph in Fig. 1 indicating merely the energy distribution in one plane.

A beam pattern of this type is not wholly desirable for use in echo ranging wherein the direction and distance of a remote object is determined by transmitting a directional compressional wave impulse and noting whether or not an echo is received from a particular direction and the time interval required for the echo to return. If the radiating device used for transmitting the signal has a uniform amplitude distribution over its radiating surface, which produces the beam pattern represented by the dotted curve in Fig. 1, it will be noted that the first of the subsidiary maxima $e_1$ has a value approximately 17 decibels below the maximum of the main beam $e_0$ and extends at an angle of approximately 22° from the axis of the main beam. Consequently the energy radiated during transmission in this direction will be of a significant value. If a reflecting object were located at the angle 22° from the axis of the main beam, an echo would be received and while the distance of the remote object could be accurately determined, its angular position would be in doubt as the observer might believe that the echo was being received along the axis of the main beam. The other subsidiary maxima $e_2$ and $e_3$, while not so large as $e_1$, are also still significant in value whereby a great deal of energy which is not useful for direction determination and may cause erroneous readings is radiated into space in directions away from the main beam.

If the same or a similar device be used for receiving, the sensitivity of the radiating member to wave energy arriving at the radiating surface from the several directions will also be of the same pattern as for transmission. Consequently the device will be relatively highly responsive to energy arriving from directions represented by the auxiliary lobes in the dotted curve in Fig. 1. The device will therefore pick up all manner of compressional wave disturbances arriving from these directions resulting in a tendency to confuse the observer and to make it difficult or impossible for him to recognize or distinguish the waves arriving along the direction of the main beam and in which the observer is particularly interested.

This disturbing effect would be greatly reduced if it were possible to remove the sensitivity of the device during reception in directions other than along its axis, provided, however, that the width of the main beam be not too greatly increased. It is known that if the diameter of the radiating surface with respect to the wave length of the signaling frequency be decreased to a point, the polar beam pattern plot as in Fig. 1 would be a circle tangent to the base line of Fig. 1. There would then be no subsidiary maxima, but, on the other hand, neither would there be any useful directional effect.

According to the present invention a beam pattern can be obtained in which the subsidiary maxima have a value low enough so that they are no longer disturbing while at the same time the directional effect of the main beam is still sufficiently pronounced to make accurate direction determination possible.

I have found that such a desirable beam pattern can be obtained by effectively varying the amplitude of the circular radiating surface from the edge of the center with the greatest amplitude at the center in accordance with a fourth degree equation. Generally stated, this is of the form $$\frac{A_r}{A_0} = \frac{\alpha - \beta \frac{r^2}{a^2} + \gamma \frac{r^4}{a^4}}{\alpha} \quad (1)$$

where the ratio $A_r/A_0$ represents the ratio of the amplitude at any radial coordinate measured from the center of the radiating surface to the amplitude at the center of the radiating surface:

$r$ is the radial distance of any point from the center of the radiating surface; and $a$ is the maximum radius of the radiating surface and $\alpha$, $\beta$ and $\gamma$ are constants.

I have found that the best beam pattern is obtained when the constants are given the values $$\alpha = 7$$
$$\beta = 12, \text{ and}$$
$$\gamma = 6$$

so that the amplitude at any point is defined as $$A_r = A_0 \frac{7 - 12\frac{r^2}{a^2} + 6\frac{r^4}{a^4}}{7} \quad (2)$$

and I prefer to use an amplitude distribution substantially in accordance with this equation. This amplitude distribution is shown by the curve $l$ in Fig. 2. In this graph the abscissae represent radial distances from the center of the radiating surface plotted in the form of the ratio $r/a$, $r$ being the radial distance of any point from the center and $a$ being the maximum radius. The amplitudes of the several points are indicated by the ordinates which represent the ratio $A_r/A_0$. Thus, the maximum amplitude at the center of the radiating surface appears as unity on the ordinate passing through the origin. The amplitude then decreases along the curve until at the edge of the radiating surface the amplitude is slightly less than 0.15 of that at the center.

This amplitude distribution will produce a beam pattern in the medium as shown by the solid curve in Fig. 1. The main lobe $E_0$ representing the main beam has a somewhat greater width than the main lobe $e_0$ produced by uniform amplitude of the radiating surface, but the auxiliary lobes $E_1$, $E_2$ and $E_3$ are very much reduced in intensity. In fact, the greatest of these subsidiary maxima $E_1$ is well over 30 db. below the maximum of the main beam. The main beam $e_0$ is somewhat increased in breadth which is an unavoidable circumstance whenever the auxiliary maxima are reduced in intensity. However, it will be noted that its width at 10 db. below the maximum is not more than 25% greater than the width of the main beam produced by the same radiating surface vibrating at the same frequency but driven at a uniform amplitude. The desirable directional properties have, therefore, not been seriously affected.

In practice it may be difficult to obtain precisely the amplitude distribution represented by Equation 2 and the curve 1 in Fig. 2, but I prefer to obtain as nearly this amplitude of distribution as possible. However, some of the advantages of the invention will be obtained by employing any monotonically decreasing amplitude distribution curve lying within the curves 2 and 3 of Fig. 2. The equations of these curves are similar to that of Equation 2, the constants $\beta$ and $\gamma$ of Equation 1 having the same values as in Equation 2, namely 12 and 6, respectively, but the constant $\alpha$ having the value 6.1 in curve 2 and the value 10.1 in curve 3.

It will be understood that the radiation patterns will vary somewhat depending upon the radius of the radiating surface and upon the signaling frequency. The beam patterns in Fig. 1 were plotted for a radiating surface having a ratio of $$\frac{a}{\lambda} = 2.122$$

where $a$ is the radius and $\lambda$ is the wave length of the radiated energy in the medium at the signaling frequency.

To achieve the proposed amplitude distribution any suitable type of device may be used, for example, those referred to in a copending application of Edwin E. Turner, Jr., Serial No. 285,910, filed July 22, 1939.

By way of example two suitable arrangements are shown herein in Figs. 3 to 6. Figs. 3 and 4 show a magnetostriction oscillator having a radiating element 1 adapted by its outer surface to contact a signaling medium. This is driven by a plurality of tubes or rods 2 of magnetostrictive material firmly fixed to the element 1 at one end and free to vibrate at the other end. These tubes may be arranged over the inner surface of the element 1 in any convenient manner but preferably are fairly uniformly spaced and they may be arranged in concentric circles as shown in Fig. 4. For clearness only a relatively small number of tubes is shown although in practice it is not uncommon to use many hundreds of tubes. Each of the tubes together with its proportion of the element 1 forms a half wave length vibrating system with the node preferably located slightly above the inner surface of the element 1. Each tube is surrounded by an electromagnetic coil 3 to which electrical energy of the proper frequency is supplied for magnetostrictively setting the tubes, and thereby the radiating surface into vibration or conversely for generating electrical energy when the radiating surface and the tubes are vibrated by compressional wave energy. An oscillator of this type is described in more detail in the copending application of Edwin E. Turner, Jr., Serial No. 677,179, filed June 23, 1933.

Another form of oscillator is shown in Figs. 5 and 6. An element 4 having a radiating surface in contact with the signaling medium has a plurality of concentric rings 5 of electrically conductive material mounted on its inner surface. Four such rings are shown in the drawings although more may be used if desired. A magnetic field is produced across each of the rings 5 by means of an electromagnet 6 having a plurality of concentric poles extending between the rings and excited by direct current polarizing coils 7. Wound on or embedded in the outside surfaces of the concentric poles are alternating current windings 8 to which energy is supplied at the signaling frequency. The rings 5 are proportioned to have a height such that together with their respective proportions of the element 4, they will each form a half wave length vibrating system at the signaling frequency. The entire system will, therefore, be set into vibration when the coils 8 are energized and conversely will generate an electromotive force in the coils 8 when the system is vibrated by compressional waves. An electrodynamic oscillator of this type is described in greater detail in the copending application of Edwin E. Turner, Jr., Serial No. 24,073, filed May 29, 1935.

When all the coils of the magnetostriction oscillator shown in Figs. 3 and 4 or all the driving coils of the electrodynamic oscillator shown in Figs. 5 and 6 are excited with alternating current of the same amplitude and phase, the respective radiating surfaces will vibrate with a uniform amplitude over the entire surface and thereby will produce a beam pattern in the medium as indicated by the dotted curve in Fig. 1. Conversely if all the coils are connected to actuate an indicating device in a uniform manner, the device as a receiver will have a sensitivity in the various directions as indicated by the same dotted curve in Fig. 1.

To produce a different transmitting or receiving beam pattern the ampere turns of alternating current excitation of the coils associated with the driving element over the area of the radiating element can be varied. The variation in ampere turns can be accomplished by varying the turns in the several coils and exciting all the coils with the same current or by giving all the coils the same number of turns but different current excitation or by a combination of these two as more fully set forth in the first above-mentioned application of Edwin E. Turner, Jr.

According to the present invention the variation of ampere turns for the successive driving elements distributed over the radiating surface is made in accordance with the equations given above. It will be understood that the devices shown and the manner of obtaining the desired amplitude variation set forth are given merely by way of example and that any suitable arrangement for this purpose can be employed.

For echo ranging and similar purposes it may often be desirable to use one beam pattern for transmission of the signal and a different beam pattern for receiving the echo. The two patterns are to be such that the significant subsidiary maxima in the pattern used for receiving will fall in different angular positions from the subsidiary maxima in the pattern used for transmission. By this means false echoes which may give rise to erroneous direction determinations will not be received. In general it is preferable to employ a uniform amplitude distribution for transmission since thereby the entire radiating surface can be vibrated at its maximum amplitude which is in each case determined by the amplitude at which cavitation of the medium takes place. Maximum energy will thereby be radiated, particularly in the direction of the main beam. If some other amplitude distribution is employed for transmission, the total radiated energy and the maximum energy in the main beam will be less than for uniform amplitude distribution because only a small portion of the radiating surface near its center can be vibrated at maximum amplitude as determined by the amplitude at which cavitation occurs, because at cavitation amplitude the energy transfer to the medium is a maximum.

I prefer, therefore, to employ uniform amplitude excitation for transmission of the signal and for reception a non-uniform amplitude distribution producing a beam pattern having auxiliary lobes greatly reduced in intensity from those produced by uniform amplitude distribution, and preferably also having the subsidiary lobes in different angular directions from those produced with uniform amplitude excitation. This can be accomplished, for example, by an arrangement shown in the application of Edwin E. Turner, Jr., Serial No. 285,910, above referred to, and reproduced in Fig. 7 herein for convenience. In Fig. 7 the elements 9, 10, 11 and 12 indicate, respectively, the alternating current coils 8 for the four rings of the electrodynamic oscillator of Figs. 5 and 6 or the four circular groups of coils 2 of the magnetostriction oscillator of Figs. 3 and 4 with the individual coils of each circular group connected together in series.

The elements 9 to 12 are connected to the tapped winding 26 of a transformer 25 through the contacts of a three-pole relay 40 having an operating coil 41. The latter is arranged to be energized from a battery or other current source 42 through the upper contact 43 of a sending key 44. When the key is not depressed, contact 43 will be closed and relay coil 41 energized whereby relay contacts 54 will all be closed. In this condition, which is for receiving, the elements 9 to 12 are each connected to appropriate portions of the winding 26 to produce a resultant response in the other winding 24 of the transformer in accordance with any desired beam pattern preferably that defined in Equation 2. The winding 24 of the transformer 25 is at this time connected through the contacts 48, 52 of a double-pole, double-throw relay 47 to a receiving amplifier 53 which may be connected to any desired indicating device.

When the key 44 is depressed for sending a signal, contact 43 is open, thereby deenergizing relay coil 41 and permitting contact 54 to open. The elements 9 to 12 are then connected in series and together across the entire winding 26 of transformer 25. Depressing the key 44 also closes contact 45 energizing the relay coil 46, whereby contacts 48 move to the right as shown in the drawings and connect with contacts 49. The transformer winding 24 is thereby connected to a suitable source of alternating potential of the signaling frequency. Since the elements 9 to 12 are now all connected in series, they will be energized equally and, assuming that they have the same numbers of turns, the beam pattern for the transmitted signal will be that of a piston as is represented by the dotted curve in Fig. 1.

By this arrangement it will be noted that the transmitted signal has a strong main beam together with subsidiary maxima at various angular directions to its axis. On receiving, however, the sensitivity distribution if made in accordance with Equation 2 will correspond to the solid curve in Fig. 1. The auxiliary maxima will be seen to be of much lower intensity in this case and the largest one $E_1$ lies in a direction different from that of any of the subsidiary maxima of the dotted curve. Consequently energy transmitted in directions other than that of the main beam, after reflection from a distant object or from discontinuities in the medium, will not be received with appreciable intensity.

The arrangement shown in Fig. 7, therefore, provides a means for changing from one beam pattern to a different beam pattern between sending and receiving. It will be evident that the arrangement shown is not limited to the use of the particular beam patterns shown in Fig. 1, but that any other two different beam patterns may be employed if desired. It is, however, particularly advantageous if the subsidiary maxima during reception do not coincide in direction with the subsidiary maxima obtained during transmission and also when the subsidiary maxima during reception are as small as possible in intensity. This arrangement is also of especial importance when it is desired to receive as little energy as possible from directions outside of the main beam and yet to transmit as much energy as possible into water during sending. Since a piston radiating surface has uniform amplitude all over its surface, its entire surface can be driven at the maximum possible amplitude, namely that at which cavitation occurs, whereby the greatest possible amount of energy will be radiated along the main axis perpendicular to the radiating surface. When some other amplitude distribution is employed, only the area of maximum amplitude can be permitted to reach the cavitation limit, while the remainder of the surface must vibrate at a lower amplitude. This results in a decreased total energy output, and at the same time decreases the maximum energy radiated along the main axis. The use of the arrangement shown in Fig. 7, however, makes it possible to radiate maximum total energy during transmission and yet have the benefits of a special beam pattern during reception.

For some purposes as in echo ranging it may further be desirable to vary the positions of the auxiliary maxima during the transmission of the signal impulse. Thereby the energy of the main beam will always be transmitted in the same direction while the energy of the auxiliary maxima or ears will be distributed in various directions. Consequently when receiving, the reflected energy of the main beam will be of normal strength while the reflected energy of the ears will be greatly weakened. Not only will reverberations due to inhomogeneities in the medium be reduced but also the likelihood of confusion between a reflection from an object in the path of the main beam and reflections from bodies outside of the main beam will be minimized.

An illustration of a suitable arrangement for shifting the beam pattern during transmission is shown in Fig. 8. The system is controlled by a sending key 44 which in its off position, as shown, has the upper contact 70 closed, thereby energizing coil 72 of the five-pole, double-throw relay 73 through the battery 42. The system is thereby placed in condition for receiving which will be more fully described later. Closing the key 44 to transmit a signal, closes the lower key contact 71 thereby energizing the coil 74 of the four-pole, double-throw relay 75 through the battery 42. The relay 75 has four movable contact arms 66, 67, 68 and 69 and six stationary contacts, the contacts 76, 77, 78 and 79 being open and the contacts 80 and 81 being connected to the contact arms 68 and 69, respectively, when the coil 74 is not energized. When the coil 74 is energized, contacts 80 and 81 open, thereby disconnecting the receiving amplifier 82 from the circuit. At the same time contact arms 68 and 69 connect with contacts 78 and 79 and contacts 76 and 77 are also closed, whereby the primary 92 is connected to a source of alternating current of the proper frequency for signaling and the motor 83 is connected to a suitable power supply.

The motor 83 is mechanically connected by suitable means as by the belt 84 and pulley 85 to the drive shaft 86 of the movable contact 87 of a potentiometer 88. One end 89 of the potentiometer and the movable contact 87 are connected across the tapped secondary 90 of the transformer 91.

The oscillator itself is represented by several groups of windings 9, 10, 11 and 12. Each of these may be constituted of one of the coils associated with the driving elements of an electrodynamic oscillator or of groups of series connected coils of a magnetostriction oscillator or of the windings of any other desired form of electroacoustic energy transformer associated with different portions of the radiating member. The elements 9 to 12 are connected in series and to the movable contacts 93 to 97 of the relay 73. Each of these movable contacts connects with the lower set of stationary contacts 98 to 102, respectively, when the relay 72 is energized and with an upper set of stationary contacts, 103 to 107, respectively, when the relay coil 72 is deenergized. The upper set of contacts 103 to 107 are connected to various taps on the potentiometer 88. The lower set of stationary contacts 98 to 102 are connected to various taps on the secondary 90 of the transformer 91.

For receiving, when key 44 is released and contact 70 is closed, relay coil 72 will be energized and the contacts will be in the position shown in the drawings. The oscillator elements 9 to 12 will then be connected each across a pair of taps of secondary 90. These taps are preferably arranged so that the turns ratio of the several transformer sections is such as will give the oscillator the beam pattern represented by Equation 2 above, although other beam patterns may be used if desired.

For transmitting, when the key 44 is depressed and contact 70 is opened, thereby deenergizing coil 72, the elements 9 to 12 will be connected through the movable contacts 93 to 97 to the upper set of stationary contacts 103 to 107, respectively, and thereby to various portions of the potentiometer 88. Since under these conditions the coil 74 of relay 75 is energized by the closing of key contact 71, the primary 92 of transformer 91 will be connected across the source of signaling current. The secondary 90 of the transformer will thereby be energized; and since it is connected between the points 89 of the potentiometer and the movable contact 87, a potential will exist across that portion of the potentiometer which is between the point 89 and the contact 87. Since the closing of the sending key energized relay coil 74, closing contacts 76 and 77, the motor 83 will therefore commence to revolve, thereby rotating potentiometer contact 87 along the potentiometer resistance element. As soon as the contact 87 leaves the point 89, all of the elements 9 to 12 of the oscillator will be energized bringing about vibration of the oscillator's radiating surface. When the contact 87 reaches the point 108, the entire potential across the secondary 90 will be impressed across the element 9, although some current will flow through the elements 10 to 12. If we assume, for example, that the element 9, which thus is energized most strongly, is associated with the central portion of the radiating surface, the consequent beam pattern, will be something like that of a point source. If this beam pattern be plotted for a plane in the medium, it will appear, in polar coordinates, substantially in the form of a circle, that is nearly all the energy will be concentrated in a main loop and there will be substantially no subsidiary loops or ears. As the contact 87 moves past the point 108, the energization of element 9 will be weakened and that of the other elements increased until at the end position 111 all the elements 9 to 12 will be energized in series. When the arm 87 moves off the potentiometer to point 112, the excitation of the oscillator elements will be interrupted and the signal impulse will cease. Any suitable arrangement can be used to return the arm 87 to its initial position and to stop the motor.

This results in a progressive change of the amplitude distribution over the radiating surface, with the consequent progressive change in the beam pattern. The subsidiary loops or ears are thereby progressively changed in intensity and direction. The energy radiated in directions other than in the region of the axis of the radiating surface will therefore be scattered over a relatively large area. Therefore, reflections from objects angularly distant from the main axis or from inhomogeneities in the medium will be irregular in time sequence and of greatly reduced intensity compared to reflections from objects in the direction of the main beam. Consequently, with respect to these latter reflections, the signal to noise ratio is considerably increased, resulting in greater effective range and reliability of the apparatus.

It will be understood that the arrangement given above for varying the direction and intensity of the subsidiary maxima is given by way of example only and that other suitable arrangements can be used.

Having now described my invention, I claim:

1. Apparatus for echo ranging with compressional waves including means for transmitting a compressional wave signal to produce a beam pattern having a maximum energy concentration in one direction and a plurality of subsidiary maximum energy concentrations in angular directions different from that of said main maximum and means for receiving reflected wave energy including a device having a beam pattern having greatest response in the direction of the main transmitted maximum and having subsidiary maximum response sensitivities in directions substantially different from the directions of the subsidiary maxima in the beam pattern of the transmitted impulse.

2. Apparatus for echo ranging with compressional waves including signal-transmitting means having a continuous finite wave radiating surface of a dimension greater than the wave length of compressional waves in the signaling medium at the signaling frequency and means for progressively varying the amplitudes of vibration of various portions between the center and the edge of said radiating surface during the transmission of a signal impulse.

3. Apparatus for echo ranging with compressional waves including means for transmitting a compressional wave signal impulse having a beam pattern with a main maximum energy concentration in one direction and a plurality of subsidiary maximum energy concentrations in angular directions different from that of said main maximum, means for varying the angular directions of said subsidiary maxima during the time of the transmission of the signal impulse while maintaining the direction of the main maximum unchanged and means for receiving reflected wave energy.

4. Apparatus for echo ranging with compressional waves including means for transmitting a compressional wave signal, said means having a continuous finite radiating surface energized at a uniform amplitude and means for receiving reflected waves, said means having a continuous finite receiving surface and a non-uniform amplitude response characteristic such that the ratio of the response $A_r$ to vibration of any point on the surface to the response $A_0$ to the same vibration of the center of the surface is substantially in accordance with the equation $$\frac{A_r}{A_0} = 1 - \frac{12r^2}{7a^2} + \frac{6r^4}{7a^4}$$

where $r$ is the radial distance of any point on the receiving surface from the center and $a$ is the maximum radius of the surface.

5. Apparatus for echo ranging with compressional waves including a device for transmitting compressional wave impulses and receiving reflected impulses having a radiating surface of a dimension greater that the wave length of compressional waves in the signaling medium at the signaling frequency, means for vibrating said surface at a uniform amplitude for the transmission of impulses and means for responding to vibrations of said surface in a non-uniform manner with the greatest response at the center of the surface, the response progressively decreasing toward the edge in such a manner that the ratio of the response $A_r$ to vibration of any point on the surface to the response $A_0$ to the same vibration of the center of the surface is substantially in accordance with the equation $$\frac{A_r}{A_0} = 1 - \frac{12r^2}{7a^2} + \frac{6r^4}{7a^4}$$

where $r$ is the radial distance of any point on the receiving surface from the center and $a$ is the maximum radius of the surface.

6. Apparatus for echo ranging with compressional waves including signal-transmitting means having a continuous finite wave radiating surface of a dimension greater than the wave length of compressional waves in the signaling medium at the signaling frequency and means for progressively varying the amplitudes of vibration of various portions between the center and the edge of said radiating surface symmetrically with respect to the center of the surface during the transmission of a signal impulse.

7. Apparatus for echo ranging with compressional waves including signal-transmitting means having a continuous finite wave radiating surface of a dimension greater than the wave length of compressional waves in the signaling medium at the signaling frequency, and means for vibrating progressively increasing portions of said surface during the transmission of a signal impulse commencing with the center and extending radially outwards toward the edges.

8. Apparatus for echo ranging with compressional waves including signal-transmitting means having a continuous wave radiating surface of a dimension greater than the wave length of compressional waves in the signaling medium at the signaling frequency, and means for progressively varying the amplitudes of vibration of various portions of said radiating surface between the center and the edge symmetrically with respect to the center of the surface during the transmission of a signal impulse.

9. A submarine signaling system including a device having a wave radiating and responsive surface of a dimension greater than the wave length of compressional waves in the signaling medium at the signaling frequency, a plurality of vibratory elements operatively associated therewith including electrical devices for vibrating said elements when supplied with electric energy and for producing electric energy in response to vibration of said elements, a power source, means for connecting said electric devices to said power source to produce uniform excitation of all said elements for signal wave transmission and thereby producing an energy distribution pattern in the medium having a main lobe of maximum energy concentration in a given direction and a plurality of subsidiary maximum energy concentrations in angular directions different from that of said main maximum, an indicating device for indicating produced electric energy and means for connecting said electric devices to said indicating device to produce non-uniform action upon said indicating device by the electric energy developed by the several electric devices during reception of the transmitted wave so that the sensitivity distribution pattern during reception has a main lobe of maximum sensitivity in the direction of the main lobe of the pattern for transmission and subsidiary lobes of maximum sensitivity in directions substantially different from the direction of the subsidiary maxima in the beam pattern for transmission.

10. A submarine signaling system including a device having a radiating member with a wave radiating and responsive surface of a dimension greater than the wave length of compressional waves in the signaling medium at the signaling frequency and adapted to contact the signaling medium, a plurality of driving elements mounted on and distributed over the opposite side of said member, a plurality of electromagnetic coils mounted in operative relation to said driving elements for vibrating said elements and thereby said member when said coils are supplied with electric energy and for producing electric energy in response to vibration of said member, a transformer having two windings the first of which is provided with a plurality of taps, a power supply, an indicating device for indicating produced electric energy and means for connecting the second winding of said transformer to said power supply and simultaneously connecting uniform groups of said coils in series and together across the first winding of said transformer for transmitting signals and thereby producing an energy distribution pattern in the medium having a main lobe of maximum energy concentration in a given direction and for connecting the second winding of said transformer to said indicating device and selected groups of said coils across different taps of the first winding of the transformer for receiving the transmitted signals so that the sensitivity distribution pattern during reception has a main lobe of maximum sensitivity in the direction of the main lobe of the pattern for transmission.

11. A submarine signaling system including a device having a radiating member with a wave radiating and responsive surface of a dimension greater than the wave length of compressional waves in the medium at the signaling frequency adapted to contact the signaling medium, a plurality of driving elements mounted on and distributed over the opposite side of said member, a plurality of electromagnetic coils mounted in operative relation to said driving elements for vibrating said elements and thereby said member for producing a signal wave when said coils are supplied with electric energy and for producing electric energy in response to vibration of said member from the received signal wave, a transformer having two windings the first of which is provided with a plurality of taps, a power supply, an indicating device for indicating produced electric energy, a keying device having transmitting and receiving positions and switch means connected to said keying device and adapted to be operated in accordance with the position of said keying device such that when the keying device is in transmitting position, the second winding of said transformer is connected to said power supply and uniform groups of said coils are connected in series and together across the first winding of said transformer and thereby producing an energy distribution pattern in the medium having a main lobe of maximum energy concentration in a given direction, while when the keying device is in receiving position, the second winding of said transformer is connected to said indicating device and selected groups of said coils are connected across different taps of the first winding of the transformer so that the sensitivity distribution pattern during reception has a main lobe of maximum sensitivity in the direction of the main lobe of the pattern for transmission.

12. A submarine signaling system including a wave radiating and responsive device having a plurality of driving elements associated therewith including electrical devices for vibrating said elements when supplied with electric energy for producing a signal wave and for producing electric energy in response to the signal wave for vibration of said elements, a power source, an indicating device for indicating produced electric energy, a transformer providing a plurality of transformation ratios and means including said transformer and switch means for connecting said electric devices to said power source to produce uniform excitation of all said elements for signal transmission and thereby producing an energy distribution pattern in the medium having a main lobe of maximum energy concentration in a given direction and for connecting said electric devices to said indicating device to produce non-uniform action thereon by the electric energy developed by the several electric devices during reception so that the sensitivity distribution pattern during reception has a main lobe of maximum sensitivity in the direction of the main lobe of the pattern for transmission.

13. A submarine signaling system including a device having a radiating member with a wave radiating and responsive surface of a dimension greater than the wave length of compressional waves in the medium at the signaling frequency and adapted to contact the signaling medium, a plurality of driving elements mounted on and distributed over the opposite side of said member, a plurality of electromagnetic coils mounted in operative relation to said driving elements, a transformer providing a plurality of transformation ratios, a power source, an indicating device and means including said transformer and switch means for connecting said coils to said power source to produce uniform excitation of all coils for signal wave transmission and thereby producing an energy distribution pattern in the medium having a main lobe of maximum energy concentration in a given direction and for connecting said coils to said indicating device to produce non-uniform action thereon by the electric energy developed by the several coils during wave reception so that the sensitivity distribution pattern during reception has a main lobe of maximum sensitivity in the direction of the main lobe of the pattern for transmission.

HAROLD M. HART.